United States Patent
Aldana et al.

(10) Patent No.: US 8,909,139 B2
(45) Date of Patent: *Dec. 9, 2014

(54) MOBILE WIRELESS COMMUNICATIONS SYSTEM INCLUDING SELECTIVELY COUPLED PAIR OF DISCONTINUOUS NFC CIRCUIT SEGMENTS AND RELATED METHODS

(75) Inventors: Leonardo Aldana, Waterloo (CA); Felipe Oliveira Simoes, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 285 days.

This patent is subject to a terminal disclaimer.

(21) Appl. No.: 13/360,250

(22) Filed: Jan. 27, 2012

(65) Prior Publication Data

US 2013/0196597 A1 Aug. 1, 2013

(51) Int. Cl.
*H04B 5/00* (2006.01)
*H04B 7/00* (2006.01)

(52) U.S. Cl.
USPC ........................................ 455/41.1; 455/41.2

(58) Field of Classification Search
USPC ............ 455/41.1, 41.2; 307/104; 361/679.01, 361/747
See application file for complete search history.

(56) References Cited

U.S. PATENT DOCUMENTS

| | | | |
|---|---|---|---|
| 7,688,270 B2 | 3/2010 | Tsushima | |
| 7,762,470 B2 | 7/2010 | Finn et al. | |
| 7,899,397 B2 * | 3/2011 | Kumar | ........................ 455/41.2 |
| 8,018,344 B2 | 9/2011 | Chang et al. | |
| 2006/0084392 A1 | 4/2006 | Marholev et al. | |
| 2009/0033627 A1 | 2/2009 | Aasen | |
| 2010/0081374 A1 | 4/2010 | Moosavi | |
| 2010/0176934 A1 | 7/2010 | Chou et al. | |
| 2010/0321255 A1 * | 12/2010 | Kough et al. | .................. 343/702 |
| 2011/0096513 A1 * | 4/2011 | Kim | .............................. 361/747 |
| 2011/0109169 A1 * | 5/2011 | Shimamoto et al. | .......... 307/104 |
| 2011/0169729 A1 | 7/2011 | Holleis et al. | |
| 2012/0229960 A1 * | 9/2012 | Pegg et al. | ............... 361/679.01 |
| 2012/0275089 A1 * | 11/2012 | Alameh et al. | ........... 361/679.01 |
| 2013/0293430 A1 * | 11/2013 | Henty | ........................... 343/720 |
| 2013/0309964 A1 * | 11/2013 | Hall et al. | .................... 455/41.1 |

FOREIGN PATENT DOCUMENTS

EP   2306369   4/2011

OTHER PUBLICATIONS

Davies, "NFC Keyboard Offers Touch and Type Convenience", Near Field Communications World, Jan. 2012, pp. 1-3.

* cited by examiner

*Primary Examiner* — Temesgh Ghebretinsae
*Assistant Examiner* — Raj Chakraborty
(74) *Attorney, Agent, or Firm* — Allen, Dyer, Doppelt, Milbrath & Gilchrist, P.A.

(57) ABSTRACT

A mobile wireless communications system may include a mobile wireless communications device including a portable housing, a wireless transceiver carried by the portable housing, and a processor carried by the portable housing and coupled to the wireless transceiver. The mobile wireless communications device may further include a near-field communication (NFC) device coupled to the processor. The system may include an adjacent NFC device configured to communicate directly with the mobile wireless communications device. The adjacent NFC device may include a plurality of pairs of discontinuous NFC circuit segments, and a respective switch assembly configured to selectively coupled each pair of discontinuous NFC circuit segments to establish NFC communication with the NFC device.

17 Claims, 9 Drawing Sheets

MOBILE WIRELESS COMMUNICATIONS SYSTEM INCLUDING SELECTIVELY COUPLED PAIR OF DISCONTINUOUS NFC CIRCUIT SEGMENTS AND RELATED METHODS

TECHNICAL FIELD

The present disclosure generally relates to the field of communications, and more particularly, to wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

Figure 1:
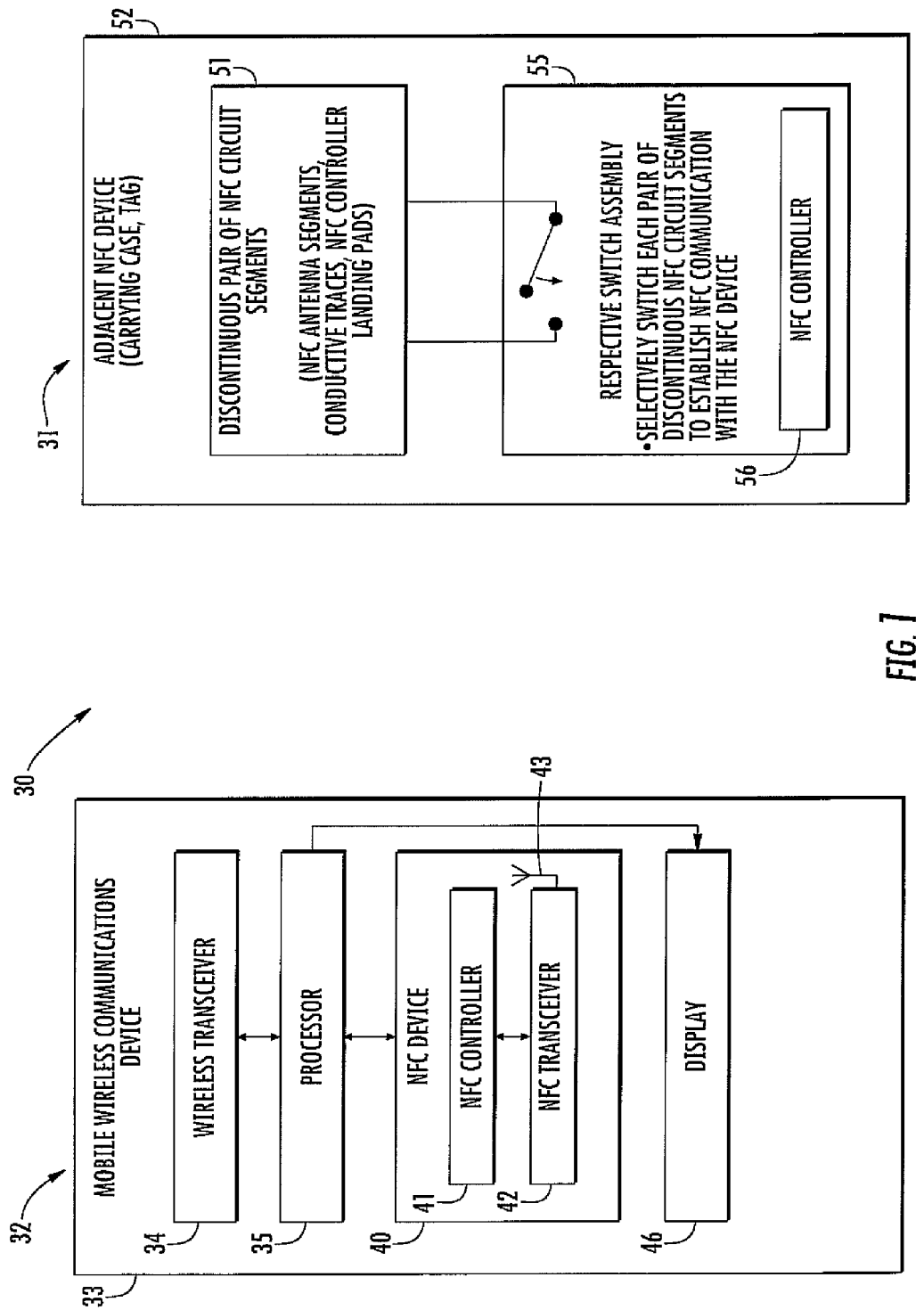
FIG. 1 is a schematic block diagram of a wireless communication system including an adjacent NFC device in accordance with an example embodiment.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

In accordance with an example embodiment, a mobile wireless communications system may include a mobile wireless communications device including a portable housing, a wireless transceiver carried by the portable housing, and a processor carried by the portable housing and coupled to the wireless transceiver. The mobile wireless communications system may further include a near-field communication (NFC) device coupled to the processor. The system may include an adjacent NFC device configured to communicate directly with the mobile wireless communications device. The adjacent NFC device may include a plurality of pairs of discontinuous NFC circuit segments, and a respective switch assembly configured to selectively coupled each pair of discontinuous NFC circuit segments to establish NFC communication with the NFC device, for example.

Each pair of discontinuous NFC circuit segments may include a pair of discontinuous conductive traces, for example. Each pair of discontinuous NFC circuit segments may include a pair of discontinuous NFC antenna segments.

The at least one switch assembly may further include at least one NFC controller, for example. The at least one switch assembly may include a plurality thereof, and the at least one NFC controller may include a respective NFC controller for each switch assembly and having a different function associated therewith.

The adjacent NFC device may further include a substrate carrying the plurality of pairs of discontinuous NFC circuit segments and the at least one switch assembly, for example. The adjacent NFC device may include a carrying case configured to carry the mobile wireless communications device. The NFC communications circuitry may be embedded within the carrying case, and the at least one switch assembly may carried by an exposed surface of the carrying case, for example.

A method aspect is directed to a method of establishing NFC communication with a mobile wireless communications device that may include a portable housing, a wireless transceiver carried by the portable housing, a processor carried by the portable housing and coupled to the wireless transceiver, and a near-field communication (NFC) device coupled to the processor. The method may include using an adjacent NFC device to communicate directly with the mobile wireless communications device by operating a respective switch assembly to selectively couple each pair of a plurality of pairs of discontinuous NFC circuit segments to establish NFC communication with the NFC device, for example.

Referring initially to FIG. 1, a mobile wireless communications system 30 illustratively includes a mobile wireless communications device 32 (also referred to as a "mobile device" herein). Example mobile wireless communications devices may include portable or personal media players (e.g., music or MP3 players, video players, etc.), portable gaming devices, portable or mobile telephones, smartphones, tablet computers, digital cameras, etc.

The mobile device 32 illustratively includes a portable housing 33 and a wireless transceiver 34 carried by the portable housing 33. The wireless transceiver 34 may comprise a cellular transceiver or other type of wireless communications transceiver, and may communicate any combination of voice and data, such as, for example, email.

The mobile device 32 includes a display 46 carried by the portable housing 33. The display 46 may comprise a liquid crystal display (LCD) and may be configured to display information relating to data or voice communications. The display 46 may be in the form of an active display that includes a backlight, for example. The display 46 may display email information, contact information, or call information. The display 46 may be another type of display, for example, a passive display, and may display other information.

The mobile device 32 also includes a processor 35 that is carried by the portable housing 33 and coupled with the wireless transceiver 34 and the display 46. The processor 35 may be implemented using hardware (e.g., memory, etc.) and software components, i.e., computer-readable instructions for causing the mobile device 32 to perform the various functions or operations described herein.

The mobile device 32 also includes a NFC device 40 carried by the portable housing 33 and coupled with the processor 35. The NFC device 40 includes a NFC controller 41 and a NFC transceiver 42 coupled with the NFC controller 41.

The NFC device 40 also includes an NFC antenna 43 carried by the portable housing 33. Of course, more than one NFC antenna may be carried by the portable housing 33 and coupled to the NFC transceiver 42.

The NFC controller 41, the NFC transceiver 42, and the NFC antenna 43 advantageously cooperate to perform at least one NFC communication function. For example, the NFC device 40 may communicate directly with an adjacent NFC device 31 that is part of the communications system 30 based upon proximity thereto using NFC communication.

The adjacent NFC device 31 is configured to communicate directly with the mobile wireless communications device 32. In other words, there are no intermediate devices or antennas, for example, to expand the range of communications between the NFC device 40 and the adjacent NFC device 31. In some embodiments, the adjacent NFC device 31 may be an NFC tag, an NFC-enabled mobile device, a carrying case, a smart poster, etc.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

As will be appreciated by those skilled in the art, adjacent NFC devices or NFC tags may be very discrete with respect to size, for example, thickness. However, there may be instances where a larger adjacent NFC device or tag may be desired to have a larger coupling range with the NFC antenna on the mobile wireless communications device. The mobile device or surface thereof where the relatively large adjacent NFC device or tag is to be mounted may be too small, or the process to make it may not permit placement of the adjacent NFC device or tag as desired. In some instances, it may not cosmetically acceptable or the adjacent NFC device may be on an exposed surface of the mobile device, which may make it subject to wear and tear by normal use. Additionally, it may be desirable to place an adjacent NFC device 31 in proximity to the NFC antenna 43, but there are a limited number of instances where NFC communication is to be triggered by some external way to cause a specific effect on the mobile device, for example.

The adjacent NFC device 31 includes a pair of discontinuous NFC circuit segments 51 carried by a substrate 52. The adjacent NFC device 31 also includes a respective switch assembly 55 carried by the substrate 52 and configured to selectively couple the pair of discontinuous NFC circuit segments 51 to establish NFC communication with the NFC device 40. The discontinuous NFC circuit segments 51 may be in the form of a discontinuous NFC antenna segments, and/or discontinuous conductive traces, for example. The discontinuous NFC circuit segments 51 may be in the form of other discontinuous circuit portions, as will be appreciated by those skilled in the art.

In some embodiments, the respective switch assembly 55 may include an NFC controller 56. In other words, the NFC controller 56 may selectively couple the discontinuous NFC circuit segments 51 to establish NFC communication with the NFC device 40. The type of NFC communication or specific commands or instructions communicated to the NFC device 40 may be based upon the NFC controller 56, for example.

Figure 2:
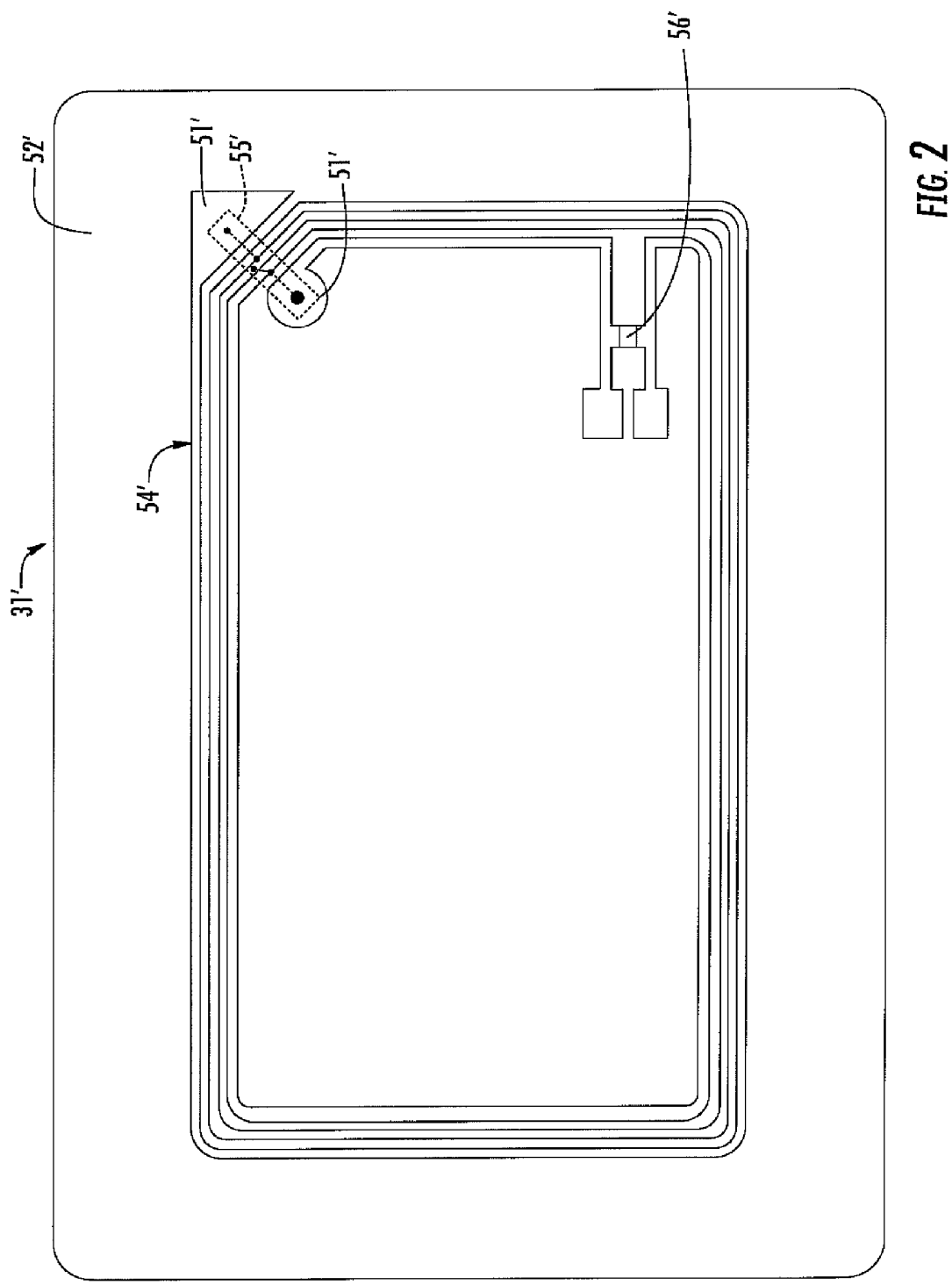
FIG. 2 is a schematic diagram of an adjacent NFC device in the form of an NFC tag in accordance with an example embodiment.

Referring now to FIG. 2, the adjacent NFC device 31' may be in the form of an NFC tag and may be configured to have an NFC antenna 54' printed, etched, pasted or placed with any other method onto the substrate 52'. The substrate 52' may be a film or PCB, for example.

On the same surface of the substrate 52', an NFC controller 56' in the form of an integrated circuit, may be electrically coupled, for example, by soldering to landing pads on the NFC antenna 54'. The NFC controller 56' stores information and executes instructions for direct communications with the NFC device 40' of the mobile device 32' when in proximity thereto.

Because the NFC antenna 54' generally has a spiral shape, it may not be possible to close the loop on the same plane or side of the substrate 52'. Thus, in a typical adjacent NFC device or tag, the two ends may be coupled with a jumper, which bridges over the NFC antenna, for example, on the other surface of the substrate. This closes the loop of the NFC antenna so it may operate as such. Other techniques may be used in typical adjacent NFC devices to close the loop of the NFC antenna, such as, for example, crimping, and thru holes with conductive material soldered or pasted to the conductive material on each end.

In contrast, in the present embodiments, the adjacent NFC device 31 illustratively includes a pair discontinuous NFC antenna segments 51', where the jumper noted above would typically be placed. Instead, a respective switch assembly 55' selectively couples each pair of discontinuous NFC antenna elements 51' to establish NFC communication with the NFC device 40'. In other words, the bridge or jumper noted above is decoupled and the switch assembly 55' in the form of an external jumper is used to close the NFC antenna 54' when NFC communications with the NFC device 40' are desired. This way, the adjacent NFC device 31' or tag can be in proximity to the mobile device 32' and can be triggered by the switch assembly 55'.

Figure 3:
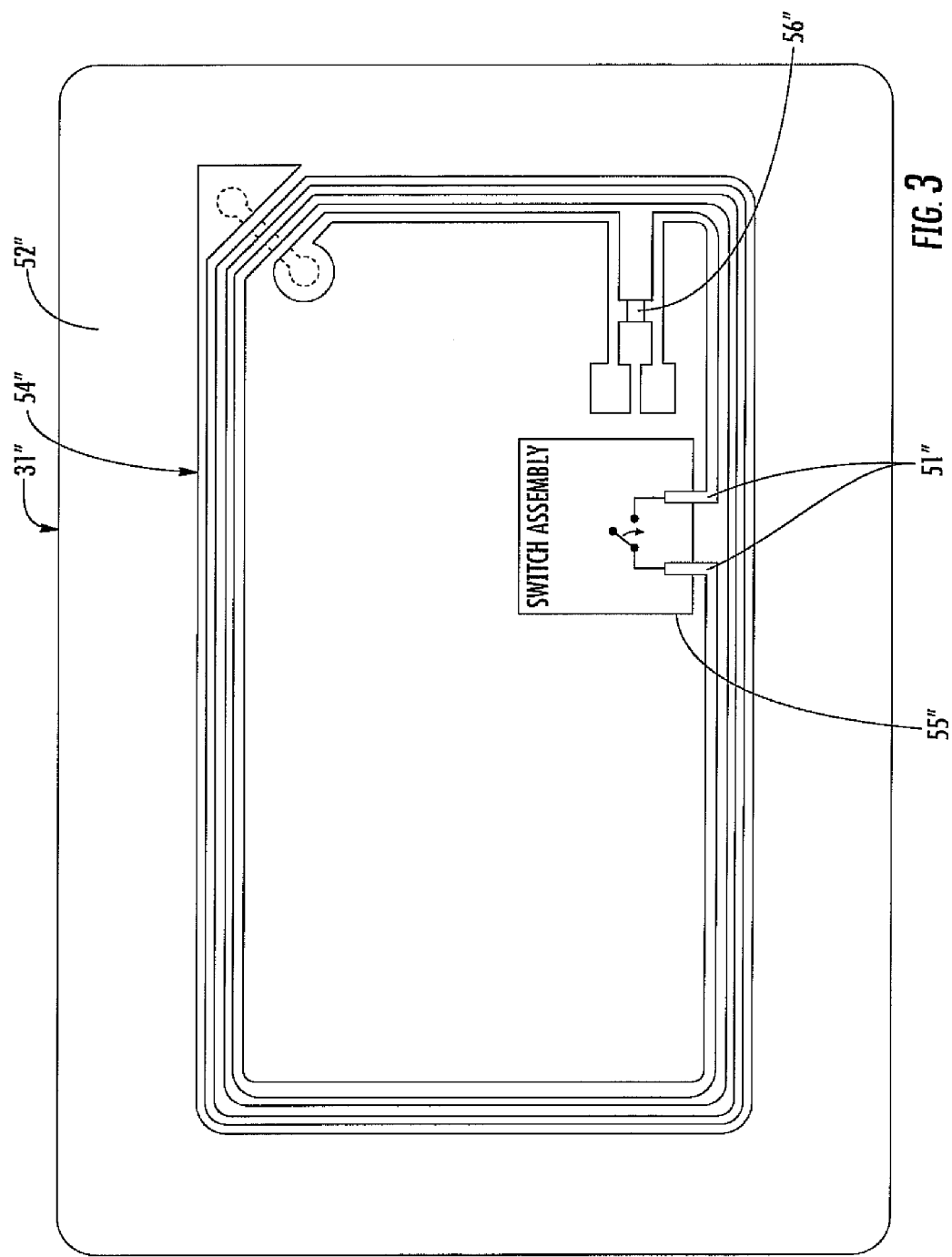
FIG. 3 is a schematic diagram of an NFC tag in accordance with another embodiment.

Referring now to FIG. 3, in another embodiment, the adjacent NFC device 31" illustratively includes a pair of discontinuous conductive traces 51". A respective switch assembly 55" selectively couples the pair of discontinuous conductive traces 51" to establish NFC communication with the NFC device 40". In other words, a segment from one of the conductive traces is removed or decoupled, and the switch assembly 55", in the form of an external jumper, for example, selectively couples the discontinuous conductive traces 51" or closes the circuit or loop. In some embodiments, the switch assembly 55" may include an exposed long decorative conductive strip or a hidden conductor with two exposed pins to complete the connection to the NFC antenna 54", for example.

Figure 4:
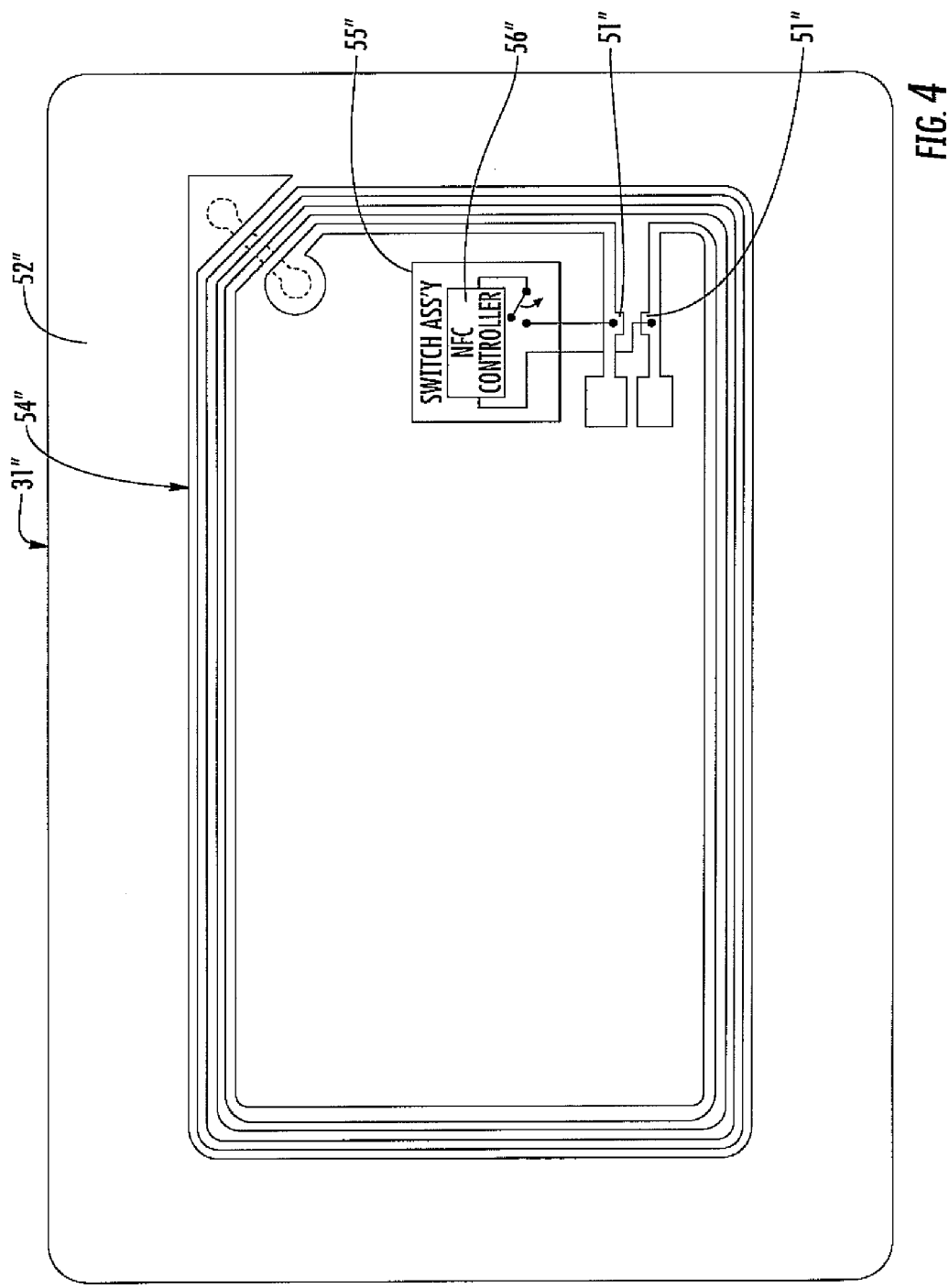
FIG. 4 is a schematic diagram of an NFC tag in accordance with another embodiment.

Referring now to FIG. 4, in another embodiment, the adjacent NFC device 31''' illustratively includes a pair discontinuous landing pads 51''' for the NFC controller 56'''. A respective switch assembly 55''', which include the NFC controller 56''' selectively couples each pair of discontinuous conductive NFC controller landing pads 51''' to establish NFC communication with the NFC device 40'''. In other words, the NFC controller 56''' is decoupled, and may be considered part of the switch assembly 55''', i.e., carried by a pushbutton. As will be appreciated by those skilled in the art, a different switch assembly 55''' and respective NFC controller 56''' may be used with the same NFC antenna 54''', each having a different NFC code or instructions for sending to the NFC device 40".

Figure 5:
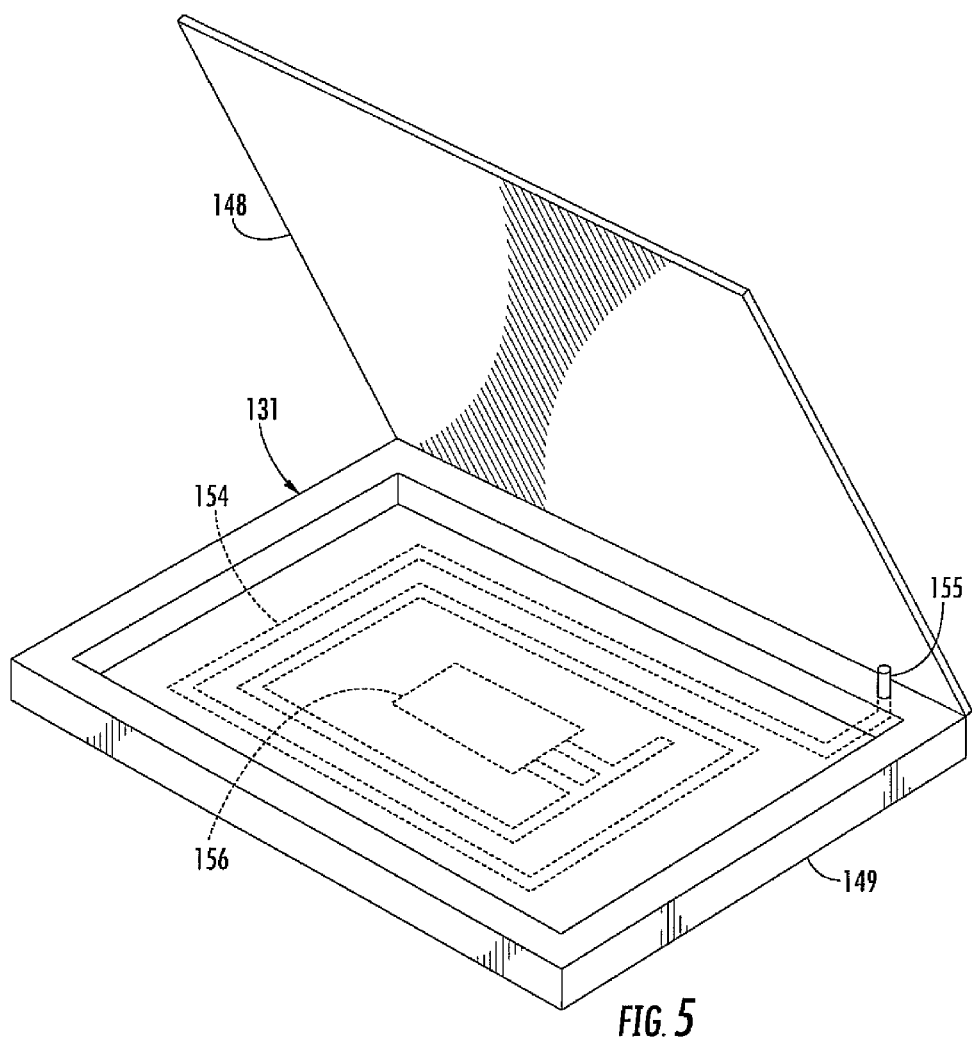
FIG. 5 is a schematic diagram of an NFC device in the form of a carrying case in accordance with an example embodiment.

Referring now to FIG. 5, in yet another embodiment, the adjacent NFC device 131 is illustratively in the form of a carrying case, i.e., an accessory, configured to carry the mobile wireless communications device. For example the carrying case may be a protective case and include a housing 149 or body portion for receiving the mobile wireless communications device therein, and a lid 148 for covering the mobile device. In some embodiments, the carrying case 131 may be in the form of a removable cover or lid, and may not include the body portion 149.

The NFC circuit elements of the carrying case 131, including the NFC antenna 154 and NFC controller 156, may be embedded in between the layers of the case. The switch assembly 155 may be carried by an exposed surface of the carrying case 131, for example. This arrangement may be particularly advantageous for using the carrying case 131, to place the mobile device in a sleep mode, for example, based upon the position of the carrying case lid 148. The switch assembly 155 is part of the lid 148, which may be in the form of a decorative strip, protruding connectors, or a logo defining contact points. Closing the lid 148 would cause the switch assembly 155 to close the NFC antenna 154 and hence the NFC antenna becomes active sending corresponding information to the mobile device to put it in a sleep mode. Of course, other information may be sent to the mobile device to cause other actions to be performed. When the lid 148 is lifted the switch assembly 155 causes to the NFC antenna 154 to be in an open circuit configuration again, and the mobile device wakes up.

This may be particularly advantageous because the NFC antenna 154 is generally not on the flexible side of the carrying case 131, i.e., lid 148, where it can be folded or bent causing conductive traces to crack. Additionally, the NFC antenna 154 may be as large as desired taking advantage of the footprint under the mobile device, which may be relatively large when the mobile device is in the form of a tablet PC, for example. Still further, the lid 148 can be folded for use without putting the mobile device to sleep.

Figure 6:
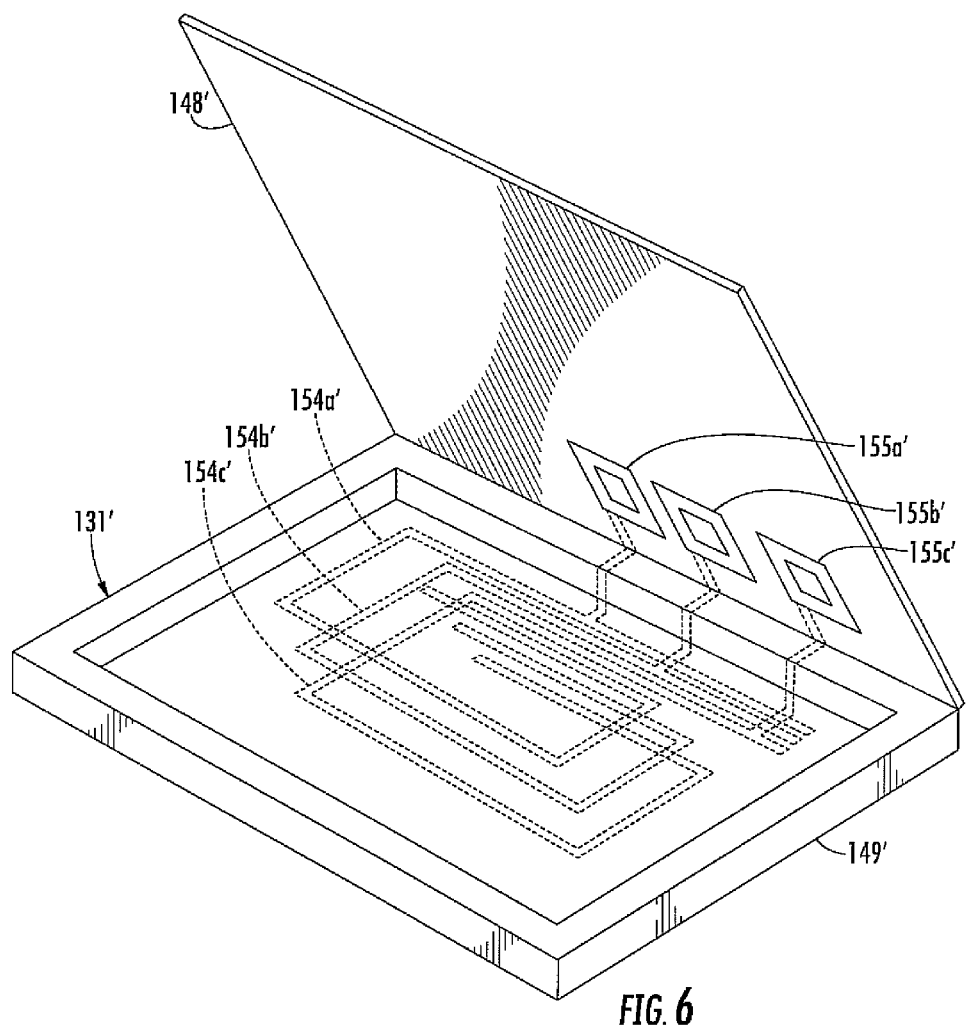
FIG. 6 is a schematic diagram of a carrying case in accordance with another embodiment.

Referring now to FIG. 6, in another embodiment, multiple different NFC antennas 154a'-154c' may be embedded in the adjacent NFC device 131' or carrying case. Illustratively, there are three NFC antennas 154a'-154c' that are in a stacked relation and embedded. Of course, any number of NFC antennas 154' may be used, some or all may be embedded and/or carried by other parts of the carrying case 131'. Each of the three NFC antennas 154a'-154c' has a respective switch assembly 155a'-155c' and NFC controller associated therewith. Each switch assembly 155', upon coupling the respective NFC antenna 155' causes different behaviors on the mobile device. In other words, one carrying case 131' may have two or more NFC antennas which can be configured on the mobile device to act as quick access buttons. These buttons may be used as extensions of the mobile device without using other wireless communications protocols, for example, Bluetooth, or other protocols that may be more strictly regulated, that may be left open for other applications, or that consume too much power.

Figure 7:
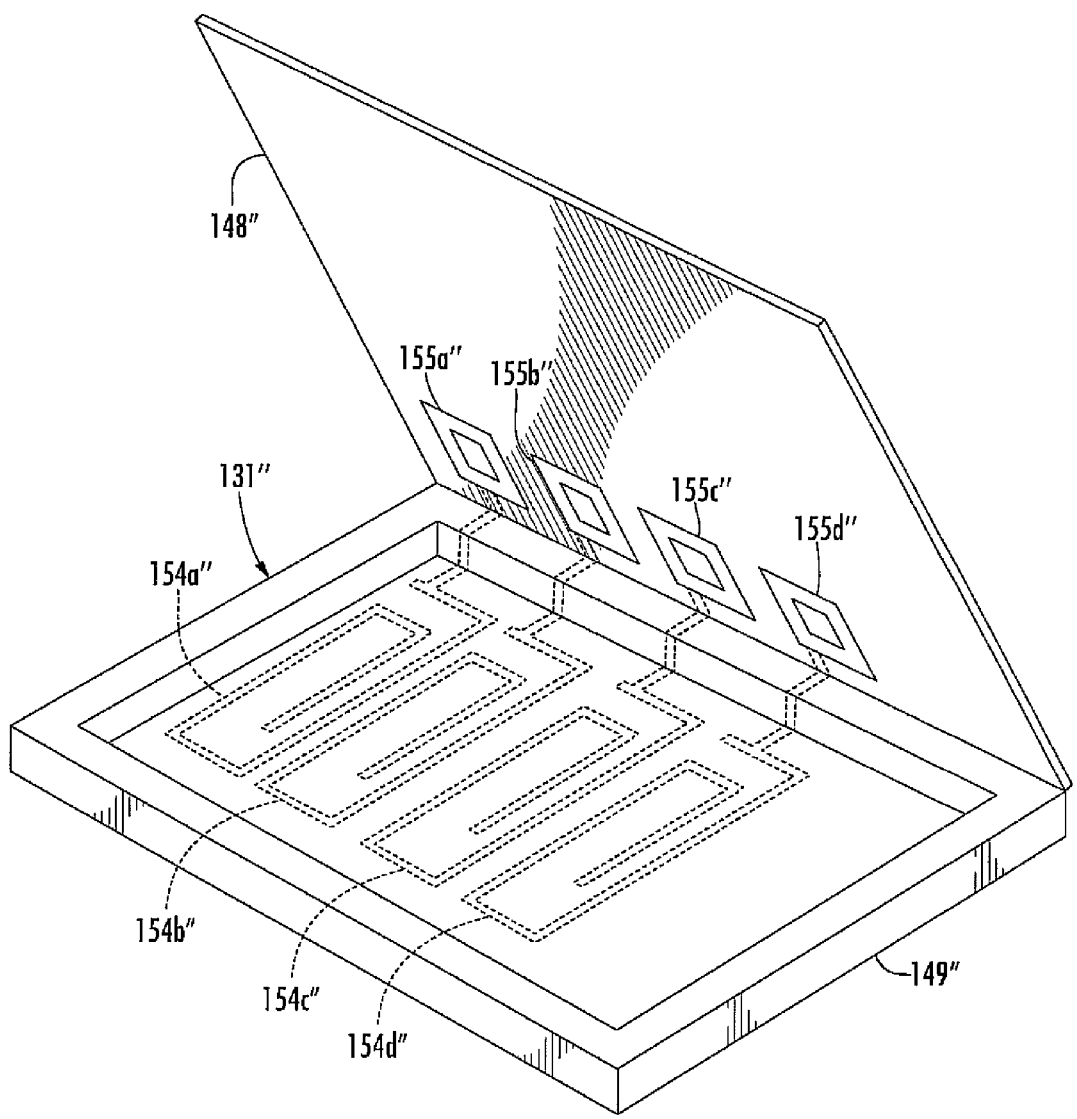
FIG. 7 is a schematic diagram of a carrying case in accordance with another embodiment.

Referring now to FIG. 7, in another embodiment, multiple NFC antennas 156" may be configured for different NFC communications functions. This embodiment, is similar to the embodiment describe above with respect to FIG. 6, but each switch assembly 155a"-155d" triggers a respective relatively small sized NFC antenna 154a"-154d". The NFC antennas 154a"-154d" are arranged in side-by-side relation. The mobile device is large enough to capture the signal for any of the NFC antennas 154a"-154d" when the respective switch assembly 155a"-155d", or button, is activated. One switch assembly 155" or button may instruct the mobile device to activate the browser, while another switch assembly may activate a camera, etc.

Figure 8:
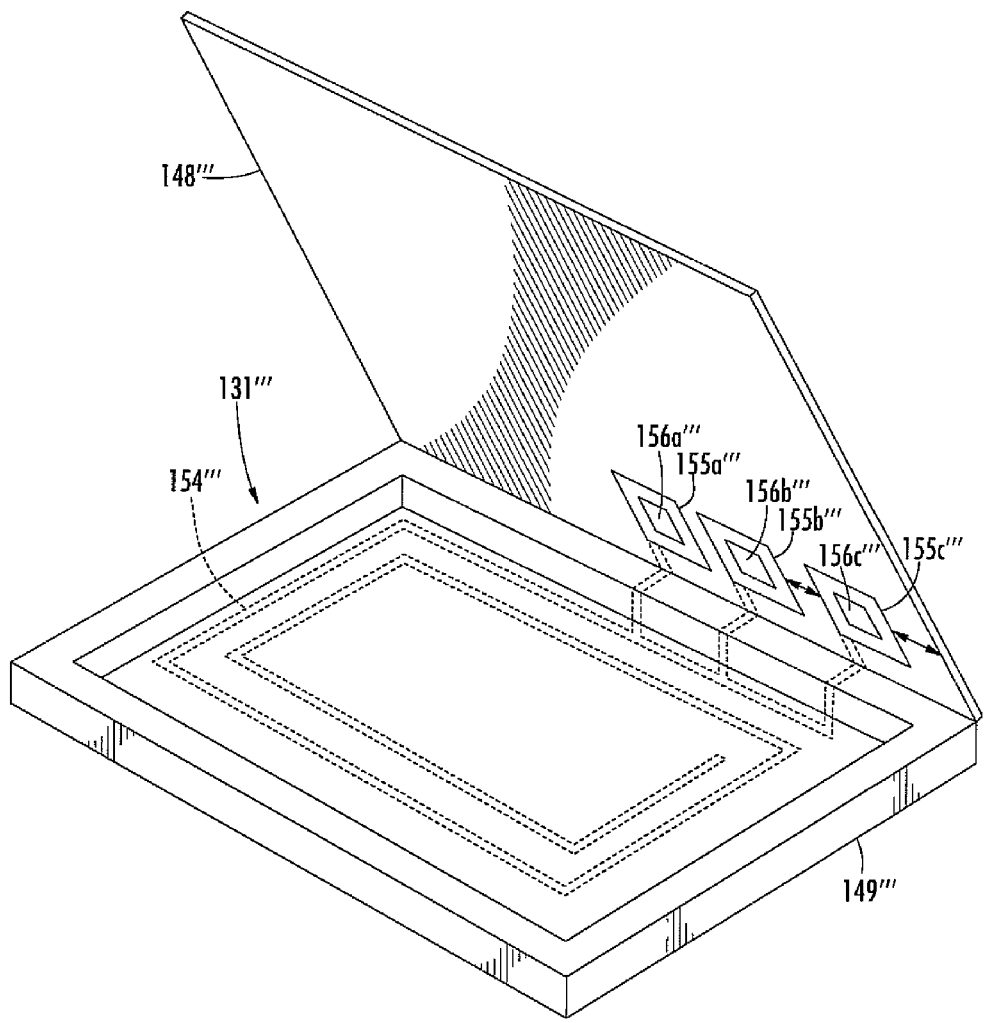
FIG. 8 is a schematic diagram of a carrying case in accordance with another embodiment.

Referring now to FIG. 8, a single NFC antenna 154''' may be coupled to a plurality of different switch assemblies 155a'''-155c'''. For example, each switch assembly 155''' may be removable or movable so that a different NFC controller 156''' may be included or integrated into each switch assembly. Each NFC controller 156a'''-156c''' has a different command or instruction set associated therewith and activates the NFC antenna 154''' with the different commands. Additionally, each NFC controller 156''' may have web links, a music album, a movie, and/or an e-book associated therewith. A user, for example, may purchase each switch assembly 155''' with the corresponding NFC controller 156''' at a store or on-line. Each switch assembly 155''' may be traded, for example, with other users using the same type of carrying case 131'''.

While the switch assemblies 155 described with respect to FIGS. 6-8 above are carried by the lid 148, and the NFC antennas 154 carried by the body portion 149 it should be understood that any number of the NFC antennas 154 and the switch assemblies may be carried by the lid, body, or by other parts of the carrying case 131. For example, the switch assemblies 155 may not be carried by the lid 148, and/or the NFC antennas 154 may be carried by the lid. Moreover, while adjacent NFC device 131 has been described with respect to a carrying case, it should be understood that the adjacent NFC device may define an accessory for the mobile device, for example, a cover, a carrying case, a holster, a cradle, a workstation, or other stationary device, for example, at a kiosk.

As will be appreciated by those skilled in the art, the adjacent NFC device 31 described herein, i.e., the carrying case and the tag, generally does not require a power source, such as, for example, a battery. Moreover, any of the above configurations or embodiments may be used alone or in combination with others to achieve a desired function. The discontinuity of the NFC circuit segments may be formed in any number of places or positions in the NFC circuitry, and the implementation of the connection between the switch assembly 55 and the NFC antenna 54 may depend on the type and size of the mobile device 32.

Additionally, it may be understood that there may be certain challenges, such as tuning the NFC antenna 54 to a switch assembly 55 that has different cross-sectional sizes and shapes than the conductive traces. Mitigation of dust and moisture may be also be desired, as will be appreciated by those skilled in the art, based upon a given application.

A method aspect is directed to a method of establishing NFC communication with an mobile wireless communications device 32 that includes a portable housing 33, a wireless transceiver 34 carried by the portable housing, a processor 35 carried by the portable housing and coupled to the wireless transceiver, and a near-field communication (NFC) device 40 coupled to the processor. The method includes using an adjacent NFC device 31 to communicate directly with the mobile wireless communications device 32 by operating a respective switch assembly 55 to selectively couple each pair of a plurality of pairs of discontinuous NFC circuit segments 51 to establish NFC communication with the NFC device 40.

Example components of a mobile wireless communications device 1000 that may be used in accordance with the above-described embodiments are further described below with reference to FIG. 9. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 9:
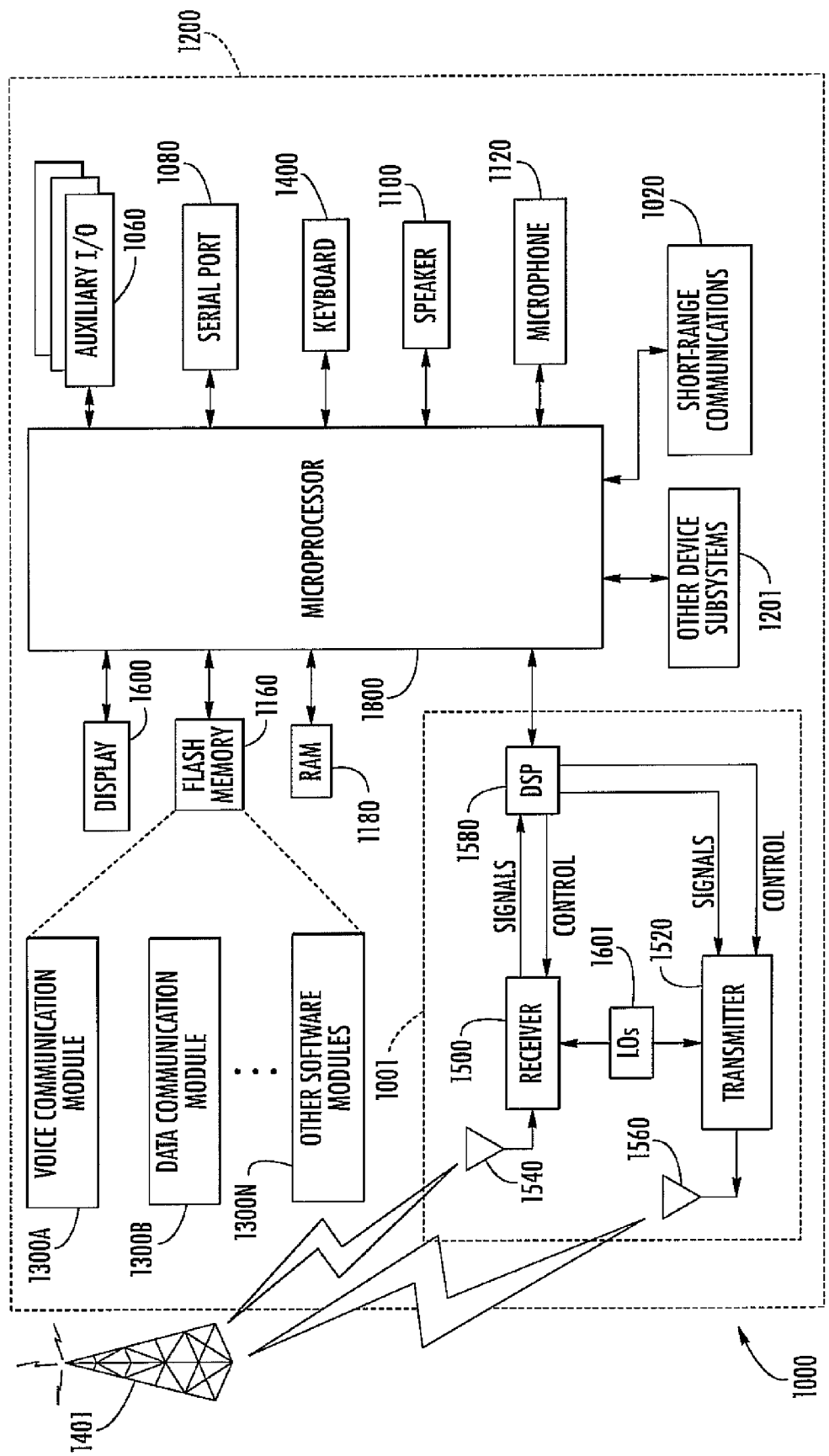
FIG. 9 is a schematic block diagram illustrating additional components of that may be included in the mobile wireless communications device of FIG. 1.

In addition to the processing device 1800, other parts of the mobile device 1000 are shown schematically in FIG. 9. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications system comprising:
a mobile wireless communications device comprising
a portable housing,
a wireless transceiver carried by said portable housing,
a processor carried by said portable housing and coupled to said wireless transceiver, and
a near-field communication (NFC) device coupled to said processor;
an adjacent NFC device configured to communicate directly with said mobile wireless communications device and comprising
a plurality of pairs of discontinuous NFC circuit segments, and
a plurality of switch assemblies each comprising a respective NFC controller having a different function associated therewith and respectively configured to selectively couple each pair of discontinuous NFC circuit segments to establish NFC communication with said NFC device to perform each different function.

2. The mobile wireless communications system of claim 1, wherein each pair of discontinuous NFC circuit segments comprises a pair of discontinuous conductive traces.

3. The mobile wireless communications system of claim 1, wherein each pair of discontinuous NFC circuit segments comprises a pair of discontinuous NFC antenna segments.

4. The mobile wireless communications system of claim 1, wherein said adjacent NFC device further comprises a substrate carrying said plurality of pairs of discontinuous NFC circuit segments and said plurality of switch assemblies.

5. The mobile wireless communications system of claim 1, wherein said adjacent NFC device comprises a carrying case configured to carry said mobile wireless communications device.

6. The mobile wireless communications system of claim 5, wherein said NFC communications circuitry is embedded within said carrying case, and wherein said plurality of switch assemblies is carried by an exposed surface of said carrying case.

7. An accessory for an adjacent mobile wireless communications device comprising a portable housing, a wireless transceiver carried by the portable housing, a processor carried by the portable housing and coupled to the wireless transceiver, and a near-field communication (NFC) device coupled to the processor, the accessory comprising:
a plurality of pairs of discontinuous NFC circuit segments; and
a plurality of switch assemblies each comprising a respective NFC controller having a different function associated therewith and respectively configured to selectively couple each pair of discontinuous NFC circuit segments to establish direct NFC communication with the NFC device to perform each different function.

8. The accessory of claim 7, wherein each pair of discontinuous NFC circuit segments comprises a pair of discontinuous conductive traces.

9. The accessory of claim 7, wherein each pair of discontinuous NFC circuit segments comprises a pair of discontinuous NFC antenna segments.

10. The accessory of claim 7, further comprising a substrate carrying said plurality of pairs of discontinuous NFC circuit segments and said plurality of switch assemblies.

11. The accessory of claim 7, further comprising a housing defining a carrying case configured to carry the mobile wireless communications device.

12. The accessory of claim 11, wherein said NFC communications circuitry is embedded within the carrying case, and wherein said plurality of switch assemblies is carried by an exposed surface of the carrying case.

13. A method of establishing NFC communication with a mobile wireless communications device comprising a portable housing, a wireless transceiver carried by the portable housing, a processor carried by the portable housing and coupled to the wireless transceiver, and a near-field communication (NFC) device coupled to the processor, the method comprising:
using an adjacent NFC device to communicate directly with the mobile wireless communications device by operating a respective switch assembly from a plurality of switch assemblies each comprising a respective NFC controller having a different function associated therewith to selectively couple each pair of a plurality of pairs of discontinuous NFC circuit segments to establish NFC communication with the NFC device to perform a corresponding one of each different function.

14. The method of claim 13, wherein each pair of discontinuous NFC circuit segments comprises a pair of discontinuous conductive traces.

15. The method of claim 13, wherein each pair of discontinuous NFC circuit segments comprises a pair of discontinuous NFC antenna segments.

16. The method of claim 13, wherein the adjacent NFC device comprises a carrying case configured to carry the mobile wireless communications device.

17. The method of claim 16, wherein the NFC communications circuitry is embedded within the carrying case, and wherein the plurality of switch assemblies is carried by an exposed surface of the carrying case.

* * * * *